(12) United States Patent
Kapke et al.

(10) Patent No.: US 7,927,195 B1
(45) Date of Patent: Apr. 19, 2011

(54) FOWL CLEANING DEVICE

(76) Inventors: Heath A. Kapke, Fairbury, NE (US);
Barry L. Kapke, Fairbury, NE (US)

( * ) Notice: Subject to any disclaimer, the term of this patent is extended or adjusted under 35 U.S.C. 154(b) by 0 days.

(21) Appl. No.: 12/592,951

(22) Filed: Dec. 4, 2009

Related U.S. Application Data

(60) Provisional application No. 61/203,032, filed on Dec. 19, 2008.

(51) Int. Cl.
*A22C 21/00* (2006.01)
(52) U.S. Cl. ....................................... 452/165
(58) Field of Classification Search .................. 452/149, 452/165, 1–6, 8, 9, 102–105, 185, 196
See application file for complete search history.

(56) References Cited

U.S. PATENT DOCUMENTS

| | | | |
|---|---|---|---|
| 2,817,111 A | 12/1957 | Conaway | |
| 2,932,849 A * | 4/1960 | Missman | 452/196 |
| 3,192,557 A * | 7/1965 | Segur | 452/185 |
| 3,945,083 A | 3/1976 | Heightshoe | |
| 4,577,368 A * | 3/1986 | Hazenbroek | 452/165 |
| 4,977,644 A * | 12/1990 | Evans et al. | 452/195 |
| 5,045,023 A * | 9/1991 | Nielsen | 452/185 |
| 5,474,491 A * | 12/1995 | Koch | 452/165 |
| 5,542,877 A * | 8/1996 | Taylor | 452/7 |
| 6,042,468 A * | 3/2000 | Lucero et al. | 452/165 |
| 7,163,452 B1 * | 1/2007 | Taylor et al. | 452/103 |
| 7,351,134 B2 * | 4/2008 | Mammoto et al. | 452/149 |

* cited by examiner

*Primary Examiner* — Thomas Price
(74) *Attorney, Agent, or Firm* — Richard John Bartz

(57) ABSTRACT

A device for removing a breast from a fowl has a base supporting a platform with a slot open to one side of the platform. An upright channel member extended through the slot is secured to the base and platform. The channel member accommodates a bar having a lower end pivoted to the lower end of the channel member to allow the bar to be moved from an upright position to a generally horizontal position to remove a breast from a fowl positioned on the platform and around the channel member.

20 Claims, 6 Drawing Sheets

US 7,927,195 B1

FOWL CLEANING DEVICE

CROSS REFERENCE TO RELATED APPLICATION

This application claims the priority of U.S. Provisional Patent Application Ser. No. 61/203,032 filed Dec. 19, 2008.

FIELD OF THE INVENTION

The invention relates to wild game cleaning devices and particularly to manually operated devices for removing a breast and wings from wildfowl, such as Canada goose and snow geese.

BACKGROUND OF THE INVENTION

Canada geese are compatible with the environment in United States and Canada. They are found on almost any type of wetland and lowland waters, including lakes, reservoirs, marshes and slow flowing rivers. Canada geese breed from 2-3 years of age throughout North America and lay clutches that vary in size from 3 to 11 eggs in April. Spring migration along the north-south flyways begins in late winter and can take several weeks to complete. The geese feed mainly on land, eating leaves, grassy plants and lawns. In urban areas, Canada geese amenity land in urban parks, open spaces, golf courses and grassed areas around lakes and ponds. They can destroy grass and flower beds and cause erosion of river and stream banks. Fall migration of Canada and snow geese begins when the water and soil begin to freeze and snow covers the grass and plant food. Small game hunting including Canada and snow geese hunting in rural and country areas, such as Nebraska, Minnesota, Wisconsin, and North and South Dakota, is a licensed activity in an effort to control geese populations. The hunting regulations of the states have limits and requirements concerning geese and other game. For example, state fish and game natural resource departments require that at least one wing of a waterfowl be retained with the fowl carcass. The fowl cleaning device of the invention is used to comply with the hunting regulations of the states of the United States.

SUMMARY OF THE INVENTION

The invention comprises a manually operated device for removing a breast and wings from a wildfowl, such as Canada and snow geese, in an effective and efficient mariner. The device is portable and useable in the field and camp sites. The device has a base adapted to support the device on a fixed surface, such as a bench or table. A hitch mount can be used to attach the base to a trailer hitch on a motor vehicle including but not limited to a pickup truck or ATV machine. A horizontal platform is supported with a plurality of legs on top of the base. The platform has a horizontal slot open to the front side of the platform. An upright channel member extended through the slot is secured to the base and platform. A lateral arm secured to the platform is used by the operator to limit twisting and turning of the device during the removal of a breast from a wildfowl. A bar located in alignment with the channel member has a first portion located adjacent the channel member and a second portion extended above the channel member. A pivot member pivotally connects the lower end of the bar to the channel member adjacent the base. The second portion of the bar is pulled by the operator to pivot the bar away from the channel member from a generally upright position to a horizontal position adjacent the base. The leverage exerted by the bar on the breast of a fowl telescoped over the channel member and bar separates the breast and wings from the body of the fowl.

DESCRIPTION OF INVENTION

Figure 1:
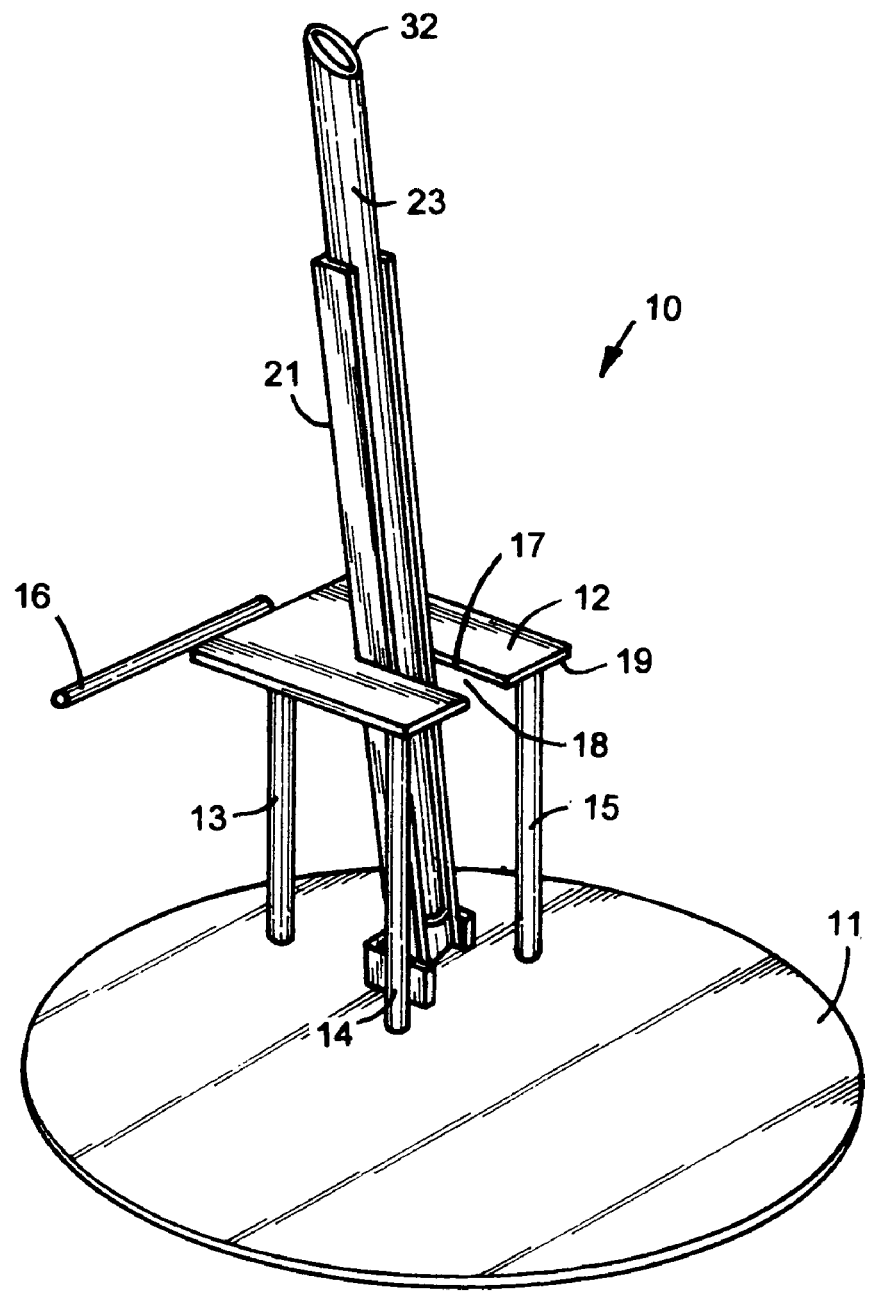
FIG. 1 is a perspective view of a wild fowl cleaning device of our invention.

A wildfowl cleaning device 10, shown in FIG. 1, is manually operated to remove the breasts of wildfowl in an advantageous and convenient manner. The term wildfowl includes gallinaceous birds including geese, ducks, turkeys; quail, snipe, partridge and pheasants. Wildfowl such as web-footed swimming birds of the family of Anatidae, snow geese and Canada geese, are specific wildfowl that are cleaned with device 10. The device is also useable to remove the breasts from domestic fowl.

Figure 5:
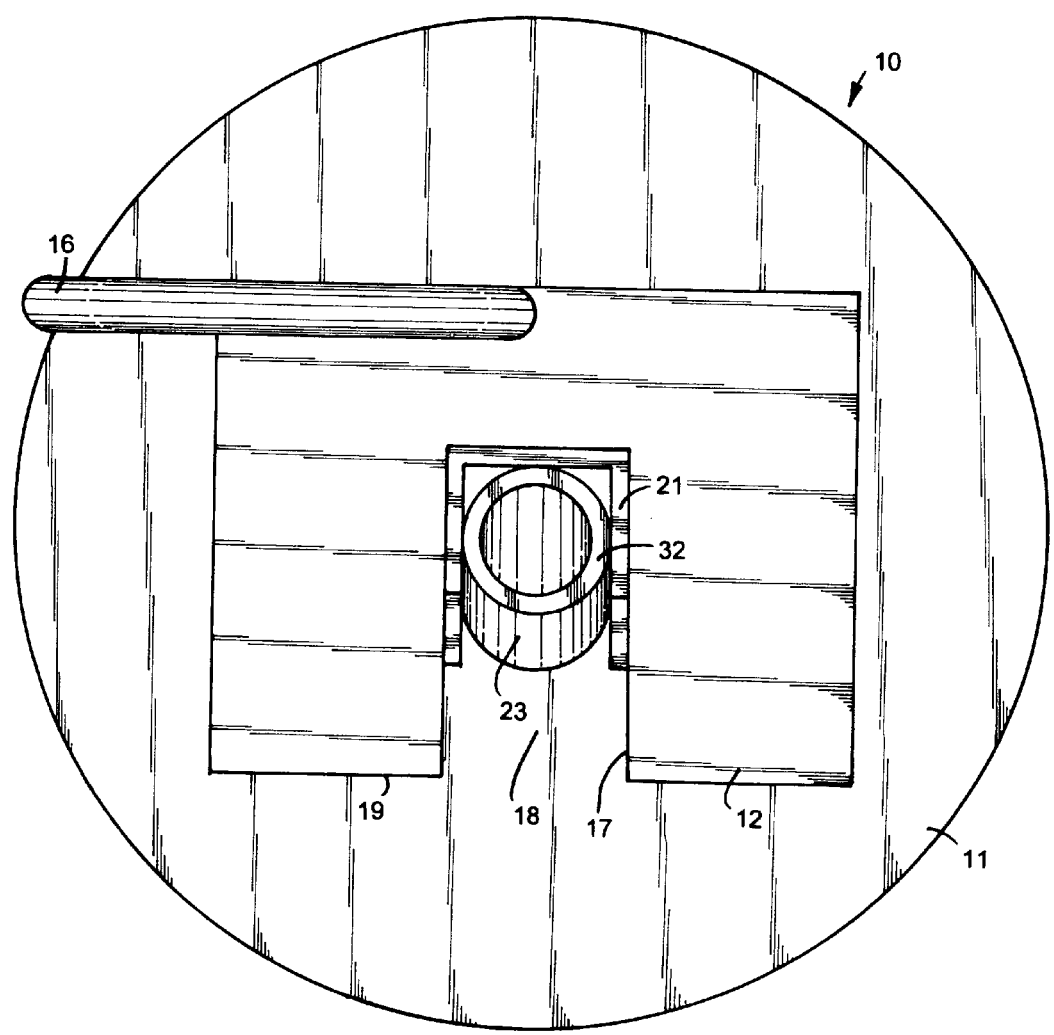
FIG. 5 is an enlarged top plan view thereof.
Figure 6:
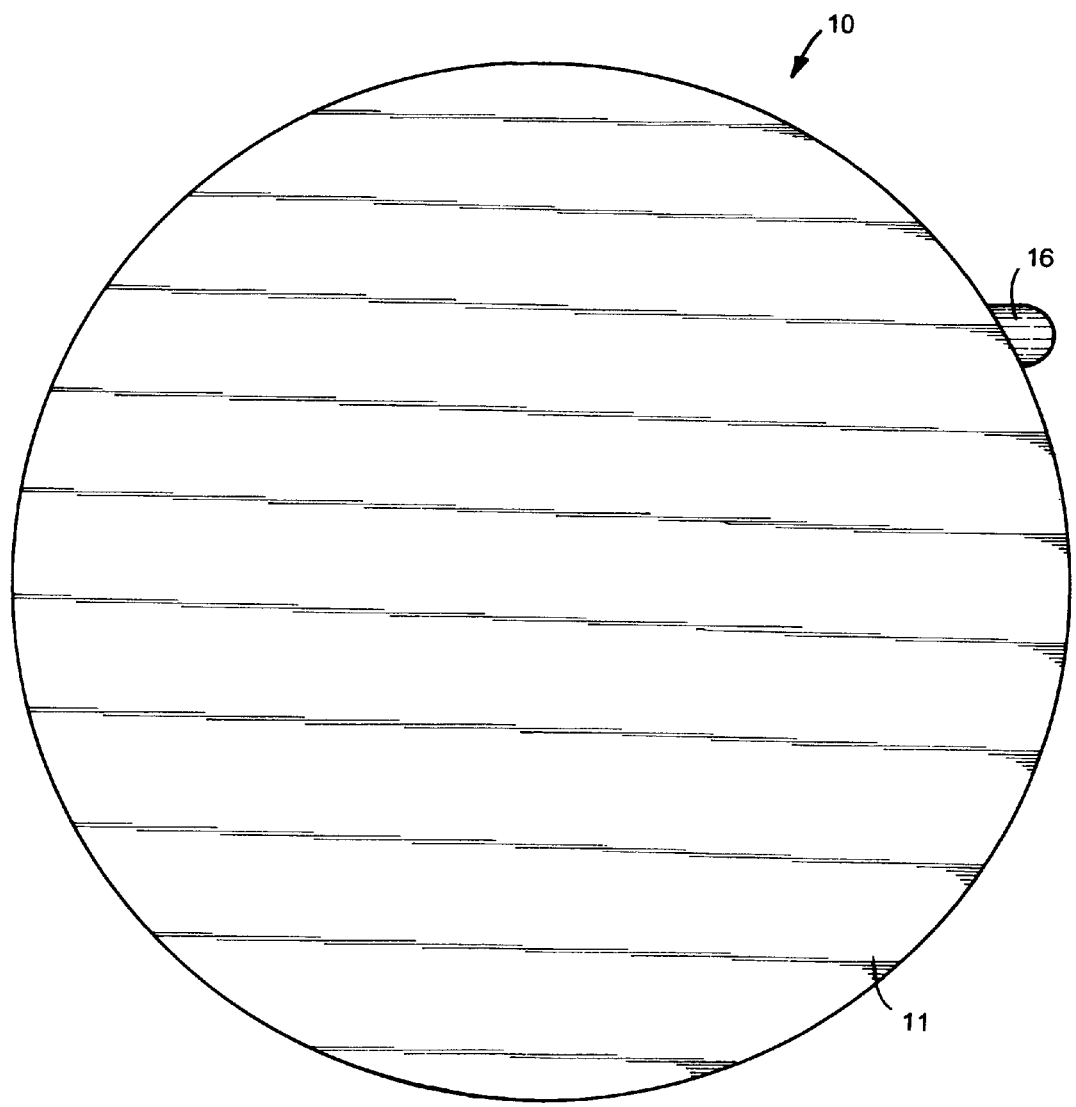
FIG. 6 is an enlarged bottom plan view thereof.

Device 10 has a generally flat base 11 for retaining and stabilizing the device on a support at an elevation suitable for use. Base 11, shown in FIGS. 1, 5 and 6, is a flat metal plate having a circular shape with flat top and bottom surfaces. Base 11 can have different shapes, such as square, rectangular and triangular structures. A hitch mount (not shown) secured to base 11 is used to support device 10 on a trailer hitch on a motor vehicle, such as a pickup truck. Other structures, such as tables, stand, elevated floors, and benches, can be used to provide a stable support for device 10.

A horizontal platform 12 is supported with upright legs 13, 14 and 15 on the top surface of base 11. Platform 12 and base 11 are located in vertically spaced parallel planes. Platform 12 is a square metal plate, such as a stainless steel plots, attached with connectors or welds to the upper ends of legs 13-15. The lower ends of legs 13-15 are secured with welds to the top surface of base 11. Platform 12 can be made of rigid materials, such as metal, plastic and composites, and have other shapes, such as circular and rectangular configurations. A rod or arm 16 secured to one side of platform 12 extends laterally from platform 12 to provide a hand grip for the operator to prevent twisting and turning of device 10 during the process of removing a breast from a wildfowl. As shown in FIGS. 1 and 5, platform 12 has a U-shaped slot 17 providing an elongated opening 18. Opening 18 extends from the front edge 19 of platform 12 past the center of section of platform 12.

Figure 3:
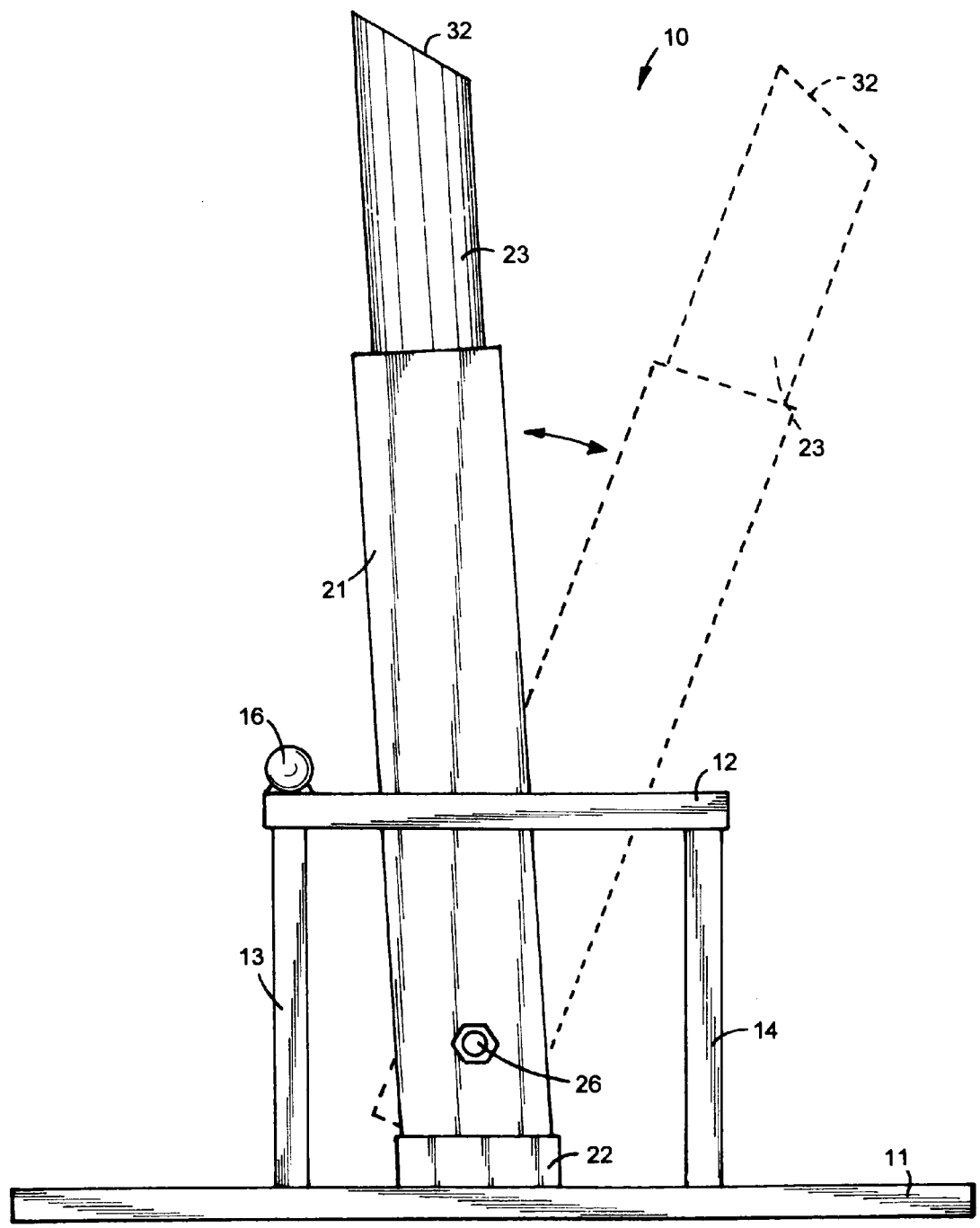
FIG. 3 is an enlarged side elevational view thereof, the opposite side being a mirror image thereof.

An upright linear channel member 21 having a U-shaped cross section extended through slot 17 is anchored to a bracket 22 secured to the top surface of base 11. Channel member 21 is also secured with a connector, such as a weld, to platform 12. Channel member 21 is open to the front of device 10. As seen in FIG. 5, channel member 21 engages and is secured to the opposite sides and the base of slot 17. Returning to FIGS. 1 and 3, channel member 21 is inclined upwardly and rearwardly at an angle between 5 to 10 degrees relative to a vertical plane perpendicular to platform 12. Channel member 21 can be inclined at other angles including vertical relative to the horizontal plane of platform 12.

Figure 2:
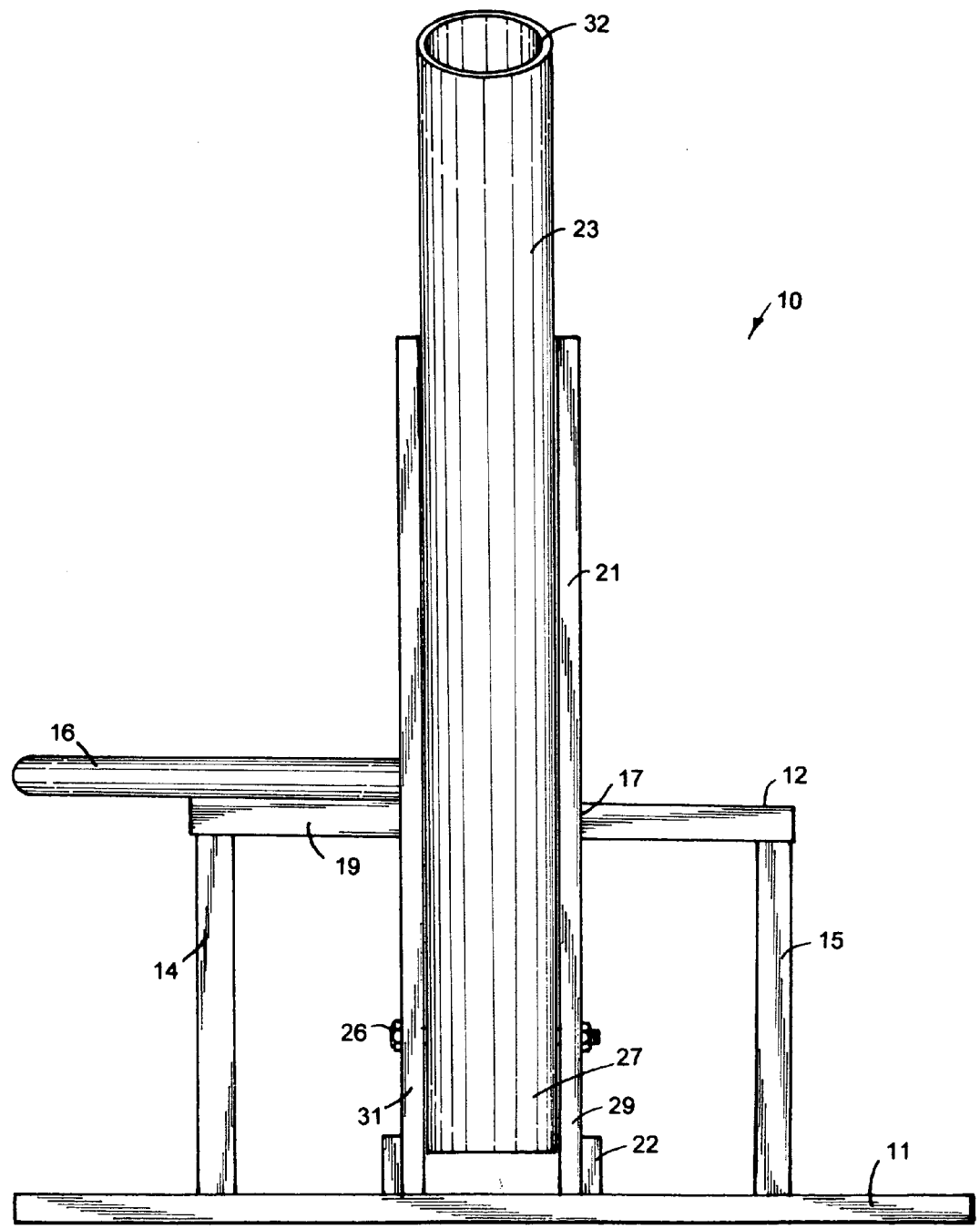
FIG. 2 is an enlarged front elevational view thereof.
Figure 4:
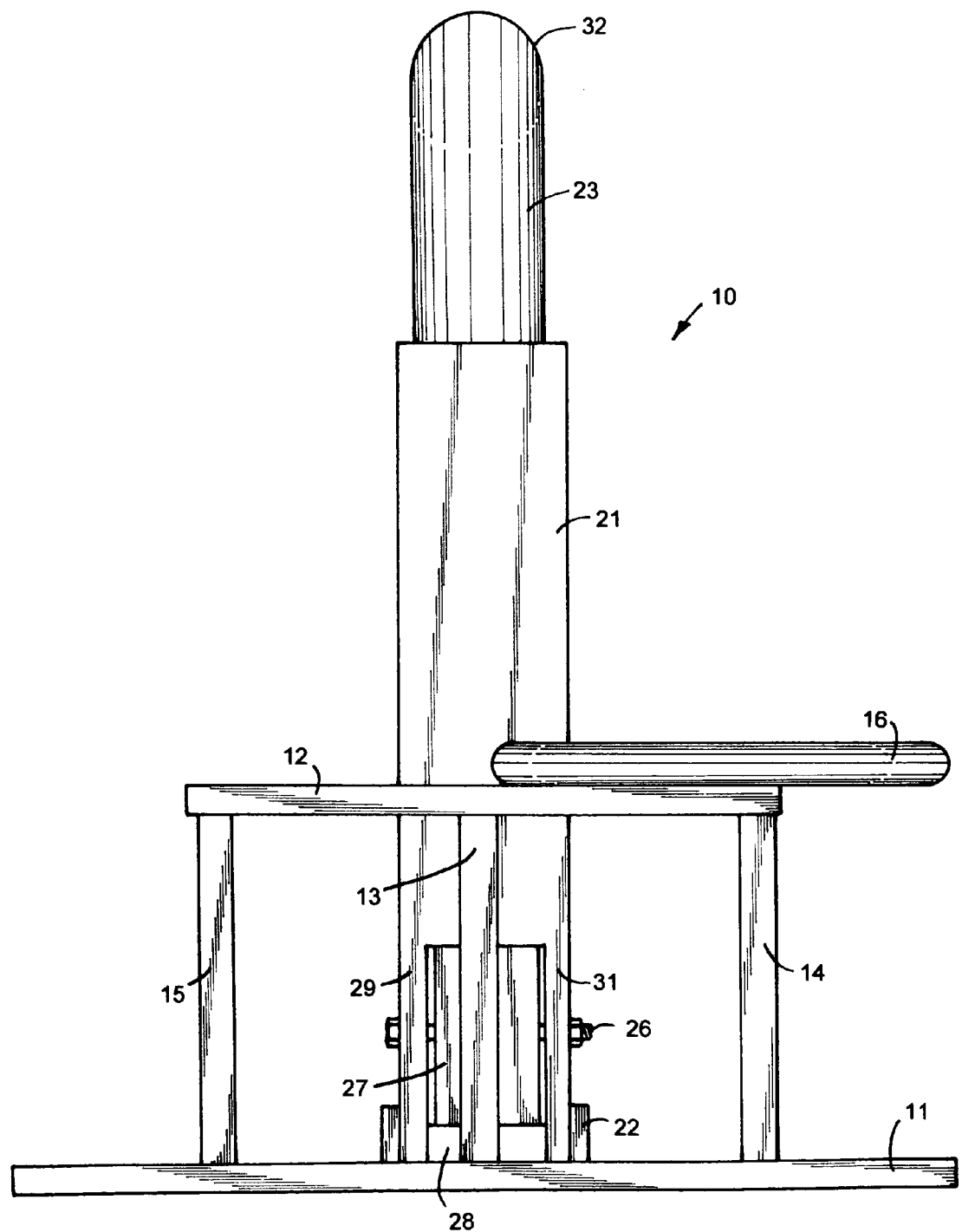
FIG. 4 is an enlarged rear elevational view thereof.

An elongated cylindrical bar 23 has a lower portion located in the groove, channel or opening 24 of channel member 21 and an upper portion extended above channel member 21. A horizontal pivot member 26, shown as a nut and bolt assembly, pivotally connects the lower end 27 of bar 23 to opposite sides of channel member 21 below platform 12 to allow bar 23 to pivot about a horizontal axis in a vertical plane relative to platform 12 and channel member 21. As shown in broken lines in FIG. 3, bar 23 pivots in a forward direction in a vertical plane about the axis of pivot member 26. Returning to FIG. 4, the lower back end portion of channel member 21 has a cutout or opening 28 between side walls 29 and 31 accommodating pivot member 26. Opening 28 allows the lower end 27 of bar 23 to move rearwardly out of channel member 21 thereby permitting bar 23 to be moved from an upright position to a horizontal position below platform 12. The upper portion of bar 23 extends upwardly above the upper end of channel member 21 and terminates in tapered upper end 32. For example, bar 23 extends about six inches above the top end of channel member 21 to allow the operator to firmly grip bar 23 and pivot bar 23 in a forward direction. Bar 23 shown in FIGS. 1, 2 and 5 as a tubular member can be a solid cylindrical member or rod.

In use, the skin on the breast of the fowl is first opened up. The body of the fowl is then telescoped onto the bar 23 and channel member 21 above platform 12. The posterior of the fowl rests on platform 12. When the fowl is placed on platform 12, the operator grips one hand on bar 16 to prevent device 10 from twisting and turning. The other hand of the operator grips the upper portion of bar 23 and pulls bar 23 in a forward direction. Bar 23 pivots about the axis of pivot member 26. The leverage exerted by bar 23 on the breast of the fowl separates or removes the breast together with the wings from the body of the fowl. One of the wings is removed from the breast as most state fish and game departments require that at least one wing of waterfowl be retained on the carcass. The device 10 can be made of stainless steel which is readily cleaned and durable in use.

The device for removing a breast from a fowl is not limited to the embodiment described herein, as it also encompasses other structures and arrangement of structures and materials embodied within the scope of the following claims.

The invention claimed is:

1. A device for removing a breast from a wildfowl comprising:
   a base comprising a generally flat first plate adapted to support the device on a surface,
   a horizontal platform comprising a generally flat second plate having a front side, and a rear side,
   a U-shaped slot in the platform open to the front side of the platform,
   a plurality of upright legs securing the platform to the second plate to the base first plate, above the base,
   a horizontal arm secured to the rear side of the platform and extended laterally away from the platform adapted to be manually held by a person to prevent twisting and turning of the device,
   an upright channel member inclined upwardly and rearwardly from the base and extended through said U-shaped slot,
   said channel member having a linear channel open to the first side thereof,
   a bracket secured to the base and channel member connecting the channel member to the base,
   a connector securing the channel member to the platform,
   a linear bar having a first portion located in the channel of the channel member and a second portion extended above the channel member, and
   a horizontal pivot member pivotally connecting the first portion of the bar to the channel member adjacent the base whereby the bar can be moved out of the channel of the channel member and U-shaped slot from an upright portion to a generally horizontal position to remove a breast from a wildfowl positioned on the platform and around the channel member.

2. The device of claim 1 wherein:
   the base is a generally circular plate and the platform is a generally square plate.

3. The device of claim 1 wherein:
   the plurality of upright legs comprise these upright rods secured to the base and platform.

4. The device of claim 1 wherein:
   the connector securing the channel member to the platform is a weld.

5. The device of claim 1 wherein:
   the channel member is inclined upwardly and rearwardly at an angle between 10 to 20 degrees relative to a vertical plane normal to the horizontal platform.

6. A device for removing a breast from a wildfowl comprising:
   a base,
   a horizontal platform having a front side,
   a slot in the platform open to the front side of the platform,
   a plurality of upright legs securing the platform to the base above the platform,
   an upright channel member extended through said slot having a channel open to the front side thereof,
   a bracket securing the channel member to the base,
   a connector securing the channel member to the platform,
   a bar having a first portion located in the channel of the channel member and a second portion extended above the channel member, and
   a pivot member pivotally connecting the first portion of the bar to the channel member below the platform whereby said bar can be moved from an upright position to a generally horizontal position to remove a breast from a wildfowl positioned on the platform and around the channel member.

7. The device of claim 6 wherein:
   the base is a generally circular and flat plate, and the platform is a generally square plate.

8. The device of claim 6 wherein:
   the plurality of upright legs comprise these upright rods secured to the base and platform.

9. The device of claim 6 wherein:
   the connector securing the channel member to the base is a weld.

10. The device of claim 6 wherein:
    the channel member is inclined upwardly and rearwardly relative to the platform.

11. The device of claim 10 wherein:
    the channel member is enclosed at an angle between 10 to 20 degrees relative to a vertical plane normal to the horizontal platform.

12. The device of claim 6 including:
    a horizontal arm secured to the platform adapted to be manually held by a person to prevent twisting and turning of the device.

13. A device for removing a breast from a fowl comprising:
    a first member adapted to be retained on a support, a second member having a front side located above the first member,
    a slot in the second member open to the front side of the second member, at least one leg securing the first member to the second member, a third member extended through said slot and secured to the first member and second member, a fourth member located adjacent the third member and extended through said slot, and a pivot member pivotally connecting the fourth member to the third member adjacent the first member whereby the fourth member can be moved away from the third member to remove a breast from a fowl positioned on the second member and extended around the third member.

14. The device of claim 13 wherein:

the first member is a first plate and the second member is a second plate located above and generally parallel to the first plate.

15. The device of claim 13 including:

a plurality of upright legs secured to the first member and second member to support the second member above the first member.

16. The device of claim 13 wherein:

the third member includes an upright channel open to a front side of the third member.

17. The device of claim 16 wherein:

the fourth member has a lower portion located in said channel and on upper portion extended above the third member.

18. The device of claim 13 wherein:

the third member is inclined upwardly and rearwardly relative to the second member.

19. The device of claim 18 wherein:

the third member is inclined at an angle of about 10 to 20 degrees relative to a vertical plane of the device.

20. The device of claim 13 including:

means securing the third member to the first member and second member.

* * * * *